United States Patent
Ramaraju et al.

(10) Patent No.: US 9,317,087 B2
(45) Date of Patent: *Apr. 19, 2016

(54) MEMORY COLUMN DROWSY CONTROL

(71) Applicants: Ravindraraj Ramaraju, Round Rock, TX (US); Jianan Yang, Austin, TX (US); Mark W. Jetton, Austin, TX (US); Thomas W. Liston, Austin, TX (US); George P. Hoekstra, Austin, TX (US); Andrew C. Russell, Austin, TX (US)

(72) Inventors: Ravindraraj Ramaraju, Round Rock, TX (US); Jianan Yang, Austin, TX (US); Mark W. Jetton, Austin, TX (US); Thomas W. Liston, Austin, TX (US); George P. Hoekstra, Austin, TX (US); Andrew C. Russell, Austin, TX (US)

(*) Notice: Subject to any disclaimer, the term of this patent is extended or adjusted under 35 U.S.C. 154(b) by 342 days.

This patent is subject to a terminal disclaimer.

(21) Appl. No.: 13/689,331

(22) Filed: Nov. 29, 2012

(65) Prior Publication Data

US 2013/0290753 A1   Oct. 31, 2013

Related U.S. Application Data

(63) Continuation-in-part of application No. 13/457,248, filed on Apr. 26, 2012, now Pat. No. 9,026,808.

(51) Int. Cl.
*G06F 1/26* (2006.01)
*G06F 1/32* (2006.01)

(52) U.S. Cl.
CPC ............. *G06F 1/26* (2013.01); *G06F 1/3225* (2013.01); *G06F 1/3275* (2013.01); *G06F 1/3296* (2013.01); *G06F 1/3203* (2013.01); *Y02B 60/1225* (2013.01); *Y02B 60/1228* (2013.01); *Y02B 60/1285* (2013.01)

(58) Field of Classification Search
CPC ..... G06F 1/3296; G06F 1/26; G06F 15/7832; G06F 3/1407
USPC .................................................. 713/320, 300
See application file for complete search history.

(56) References Cited

U.S. PATENT DOCUMENTS

| 6,079,023 | A | 6/2000 | Yoon et al. |
| 6,552,949 | B1 * | 4/2003 | Silla et al. ................. 365/227 |
| 6,577,524 | B2 | 6/2003 | Brooks et al. |
| 7,260,694 | B2 | 8/2007 | Flautner et al. |
| 7,533,226 | B2 | 5/2009 | Flautner et al. |
| 7,558,104 | B2 | 7/2009 | Sowden et al. |

(Continued)

OTHER PUBLICATIONS

Homayoun, H. et al., "Dynamic Register File Resizing and Frequency Scaling to Improve Embedded Processor Performance and Energy-Delay Efficiency," 45th ACM/IEEE Design Automation Conference; Jun. 8-13, 2008; pp. 68-71.

(Continued)

*Primary Examiner* — Thomas Lee
*Assistant Examiner* — Volvick Derose

(57) ABSTRACT

In accordance with at least one embodiment, column level power control granularity is provided to control a low power state of a memory using a drowsy column control bit to control the low power state at an individual column level to protect the memory from weak bit failure. In accordance with at least one embodiment, a method of using a dedicated row of bit cells in a memory array is provided wherein each bit in the row controls the low power state of a respective column in the array. A special control signal is used to access the word line, and the word line is outside of the regular word line address space. A mechanism is provided to designate the weak bit column and set the control bit corresponding to that particular column to disable the drowsy/low power state for that column.

19 Claims, 8 Drawing Sheets

(56) References Cited

U.S. PATENT DOCUMENTS

| | | | |
|---|---|---|---|
| 7,782,701 B2 | 8/2010 | Seo et al. | |
| 8,112,652 B2* | 2/2012 | Sajayan et al. | 713/324 |
| 2005/0200383 A1* | 9/2005 | Ogata | 326/41 |
| 2006/0039182 A1* | 2/2006 | Sakurai et al. | 365/154 |
| 2008/0091965 A1* | 4/2008 | Nychka et al. | 713/323 |
| 2008/0158939 A1* | 7/2008 | Chen et al. | 365/154 |
| 2008/0186791 A1* | 8/2008 | Lih et al. | 365/226 |
| 2009/0024819 A1 | 1/2009 | Fisher et al. | |
| 2009/0249105 A1* | 10/2009 | Sajayan et al. | 713/324 |
| 2010/0061171 A1* | 3/2010 | Kim et al. | 365/210.1 |
| 2010/0128549 A1* | 5/2010 | Dudeck et al. | 365/226 |
| 2010/0191999 A1 | 7/2010 | Jeddeloh | |
| 2010/0214863 A1 | 8/2010 | Chan et al. | |
| 2012/0002499 A1 | 1/2012 | Kinkade et al. | |
| 2012/0005512 A1 | 1/2012 | Chew | |
| 2012/0051112 A1* | 3/2012 | Tang et al. | 365/51 |
| 2012/0147680 A1* | 6/2012 | Koike | 365/189.011 |
| 2012/0179923 A1* | 7/2012 | Sasaki et al. | 713/300 |
| 2013/0332763 A1 | 12/2013 | Palaniappan et al. | |
| 2013/0339590 A1* | 12/2013 | Tsuruda et al. | 711/103 |

OTHER PUBLICATIONS

Hua, Chung-Hsien et al., "Distributed Data-Retention Power Gating Techniques for Column and Row Co-Controlled Embedded SRAM," Proceedings of the 2005 IEEE International Workshop on Memory Technology, Design, and Testing; Aug. 5, 2005, pp. 129-134.

Masgonty, Jean-Marc et al., "Low-Power SRAM and ROM Memories," Workshop on Power and Timing Modeling, Optimization and Simulation (PATMOS), Yverdon-Les-Bains; 2001; 8 pages.

Non-Final Office Action mailed May 28, 2014 for U.S. Appl. No. 13/457,248, 10 pages.

Final Office Action mailed Oct. 16, 2014 for U.S. Appl. No. 13/457,248, 7 pages.

Notice of Allowance mailed Jan. 7, 2015 for U.S. Appl. No. 13/457,248, 7 pages.

* cited by examiner

MEMORY COLUMN DROWSY CONTROL

CROSS-REFERENCE TO RELATED APPLICATION(S)

This application is a continuation-in-part (CIP) application of U.S. patent application Ser. No. 13/457,248, filed Apr. 26, 2012.

BACKGROUND OF THE INVENTION

1. Field of the Invention

The present disclosure relates generally to electronic devices and, more specifically, to device having electronic memory.

2. Description of the Related Art

Low-power memory design has been a research area for many years, and power gating has become an industrialized technology used to place an array of memory cells into sleep mode or a shutdown mode. However, such techniques can be inefficient for managing power consumption, for example, when a small portion of a memory array needs to remain active the benefits of array level power gating can be largely negated.

In addition, static leakage power consumption of memory is becoming a significant portion of the total power used by memory, and, due to an exponential relationship of leakage current to voltage, lowering the voltage applied to a memory by a few hundred millivolts reduces the static leakage power consumption (and thus also the total power consumption) significantly. Such a lowered voltage level can be referred to as a drowsy voltage level, as power savings approaching those of a sleep mode can be realized by such a reduction of the voltage level from an operational voltage level to a drowsy voltage level. A memory can be said to be in a drowsy state when its voltage level is reduced to the drowsy voltage level, and can be understood to be a data retention state, as application of the drowsy voltage level to bit cells allows retention of data in such bit cells. However, a drowsy voltage level (e.g., a reduced voltage level) during an inactive state cannot be applied if there are weak bits in the memory array, which are bits of the array that are not able to maintain their storage state when a drowsy voltage level is applied. Such inability to maintain a storage state can be related to aging. When the bit array has a weak bit, then the bit array is prevented from being maintained in a low power state to save leakage power, as being in the low power state can alter the value stored in the weak bit. Thus, the presence of weak bits or even just the risk of occurrence of weak bits can impair the use of power saving techniques and effectively increase the power consumption of memory.

BRIEF DESCRIPTION OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION OF THE INVENTION

A memory array is disclosed herein that facilitates memory power gating for subarray portions of a memory array. In accordance with at least one embodiment of the disclosure, memory power gating is enabled by adding an extra control bit to each subarray (e.g., each word, each row, each wordline, each bitline, each portion of an array, etc.) of a memory array, to implement fine-grained power reduction for a memory array. The control bit can be addressed and written to in a manner similar to other bits of the memory array. In accordance with at least one embodiment, a gating transistor is provided for each subarray (e.g., each word, each row, each wordline, each bitline, each portion of an array, etc.).

Figure 1:
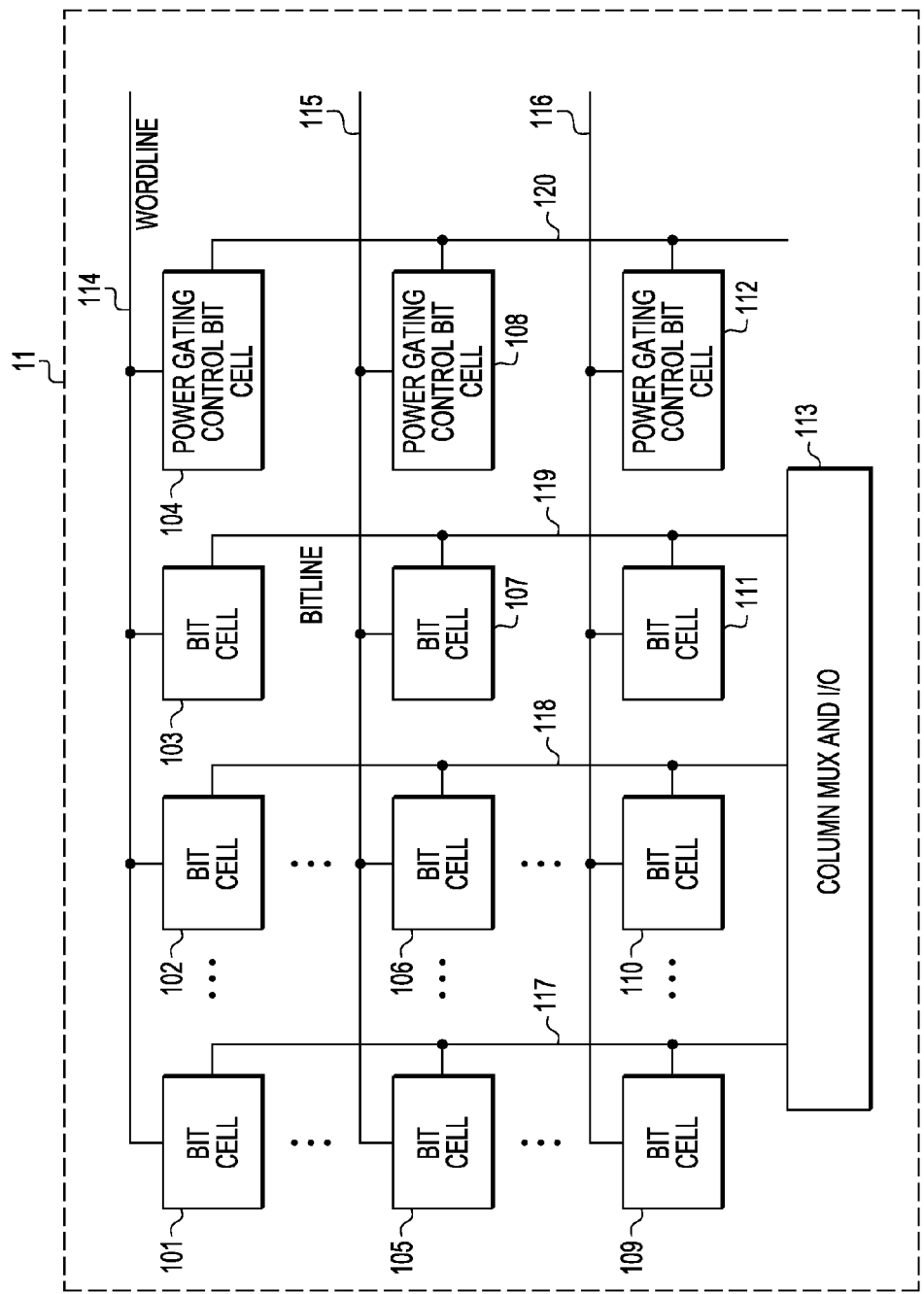
FIG. 1 is a block diagram of a low power memory device with fine granularity power gating in accordance with at least one embodiment.

FIG. 1 is a block diagram of a device 10 having a low power memory device 11 with fine granularity power gating in accordance with at least one embodiment. Device 10 is a system device that includes a memory device 11. Examples of system devices include consumer electronics, durable goods, and the like. As further examples, system devices may be implemented as battery powered apparatus, such as handheld devices and other portable devices. Also, system devices may include electronics powered by utility power sources, alternative power sources, such as solar power sources, kinetic power sources (e.g., piezoelectric power sources), biologically active power sources, etc. The low power memory device 11 comprises data memory cell 101, data memory cell 102, data memory cell 103, power control memory cell 104, data memory cell 105, data memory cell 106, data memory cell 107, power control memory cell 108, data memory cell 109, data memory cell 110, data memory cell 111, power control memory cell 112, and column multiplexer (mux) and input/output (I/O) circuit 113.

The low power memory device 11 comprises a memory array comprising rows of data memory cells. A first row comprises data memory cells 101, 102, and 103. A second row comprises data memory cells 105, 106, and 107. A third row comprises data memory cells 109, 110, and 111. The number of rows illustrated is merely exemplary, and embodiments may be implemented with other numbers of rows.

The data memory cells of the memory array also comprise columns. A first column of the columns comprises data memory cells 101, 105, and 109. A second column comprises data memory cells 102, 106, and 110. A third column comprises data memory cells 103, 107, and 111. The number of columns illustrated is merely exemplary, and embodiments may be implemented with other numbers of columns.

In accordance with at least one embodiment, a power control memory cell is provided for each row of the low power memory device. For example, power control memory cell 104 is provided for the first row, power control memory cell 108 is provided for the second row, and power control memory cell 112 is provided for the third row. As an example, power control memory cell 104 provides power control to enable and disable power for data memory cells 101, 102, and 103, power control memory cell 108 provides power control to enable and disable power for data memory cells 105, 106, and 107, and power memory cell 112 provides power control to enable and disable power for data memory cells 109, 110, and 111. In accordance with at least one embodiment, each row of the memory array stores one word of data, allowing each power control memory cell to provide power control for a single memory word (i.e., word level power control granularity).

A wordline 114 is connected to data memory cells 101, 102, and 103 and to power control memory cell 104, a wordline 115 is connected to data memory cells 105, 106, and 107 and to power control memory cell 108, a wordline 116 is connected to data memory cells 109, 110, and 111 and to power control memory cell 112. A bitline 117 is connected to data memory cells 101, 105, and 109, a bitline 118 is connected to data memory cells 102, 106, and 110, and a bitline 119 is connected to data memory cells 103, 107, and 111. Bitlines 117, 118, and 119 are connected to column multiplexer (mux) and input/output (I/O) circuit 113, which allows access to the data bits of a word stored in data memory cells selected by, for example, one of wordlines 114, 115, and 116. A bitline 120 is connected to power control memory cells 104, 108, and 112, which allows access to the power control bits stored in power control memory cells selected by, for example, one of wordlines 114, 115, and 116. Bitline 120 for the power control memory cells 104, 108, and 112 is implemented as a special input/output (I/O) line separate from bitlines 117, 118, and 119 connected to column multiplexer (mux) and input/output (I/O) circuit 113 so as to allow independent access to the power control memory cells 104, 108, and 112 to allow reading and writing of power control bits stored in power control cells 104, 108, and 112.

Figure 2:
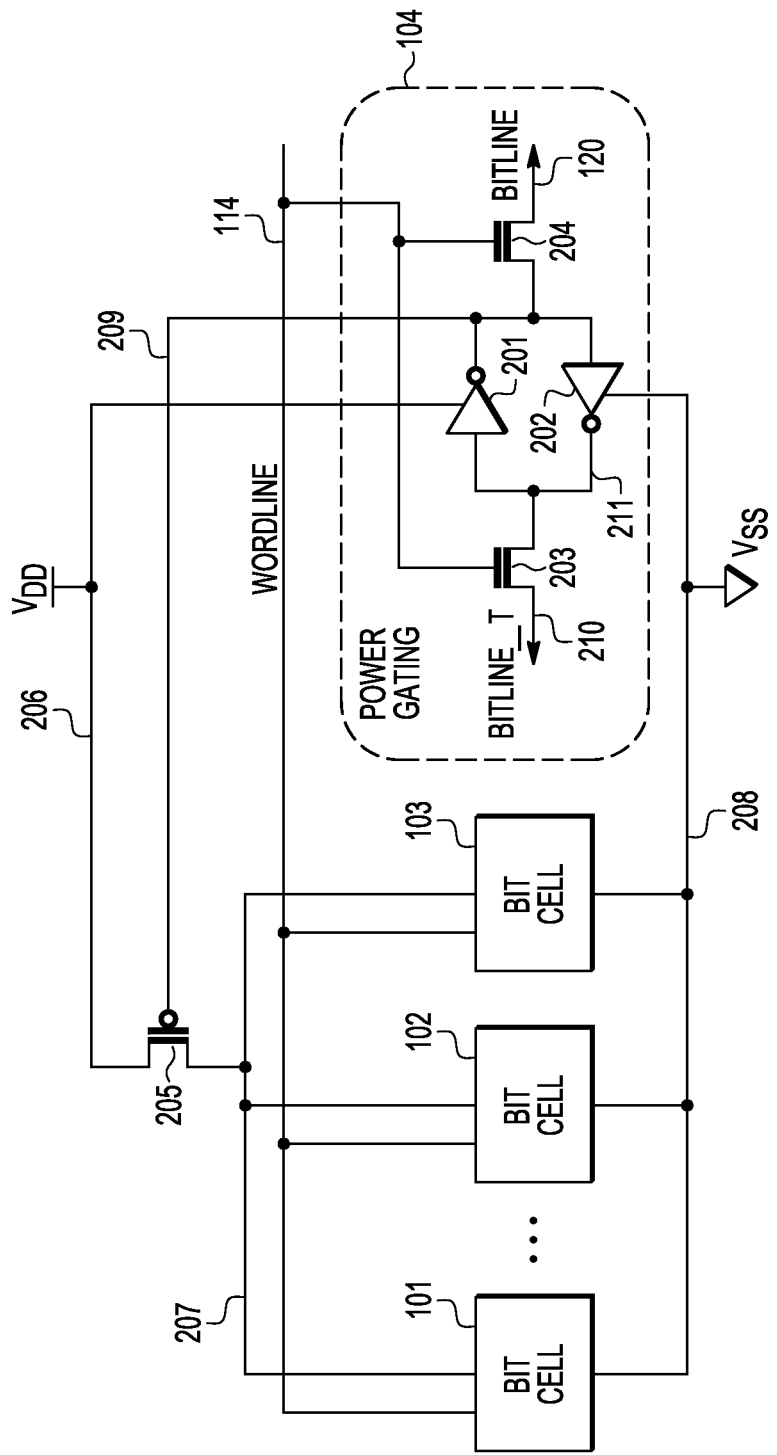
FIG. 2 is a schematic diagram of a row of memory cells with fine granularity power gating in accordance with at least one embodiment.

FIG. 2 is a schematic diagram of a row of memory cells with fine granularity power gating in accordance with at least one embodiment. The row of memory cells comprises data memory cells 101, 102, and 103. Power control memory cell 104 is provided for the row of memory cells and controls power to the row of memory cells, allowing the row of memory cells to be enabled and disabled. Wordline 114 is connected to data memory cells 101, 102, and 103 and to power control memory cell 104. Bitline 120 is connected to power control memory cell 104.

In accordance with at least one embodiment, power control memory cell 104 comprises inverter 201, inverter 202, negative type (n type) channel (n channel) metal oxide semiconductor (MOS) field effect transistor (FET) (i.e., NMOS FET) 203, and NMOS FET 204. Bitline 120 is connected to a first source/drain terminal of NMOS FET 204. Wordline 114 is connected to a gate terminal of NMOS FET 204. A second source/drain terminal of NMOS FET 204 is connected to node 209, which is connected to an output of inverter 201, to an input of inverter 202, and to a gate terminal of positive type (p type) channel (p channel) metal oxide semiconductor (MOS) field effect transistor (FET) (i.e., PMOS FET) 205, which functions as a data cell power switch. In accordance with at least one embodiment, node 209 serves as the output of power control memory cell 104, and the logic state of node 209 is the state of power control memory cell 104. A drain terminal of PMOS FET 205 is connected to node 207, which is connected to positive supply terminals of data memory cells 101, 102, and 103.

The output of inverter 202 is connected to node 211, which is connected to the input of inverter 201 and to a first source/drain terminal of NMOS FET 203. Wordline 114 is connected to a gate terminal of NMOS FET 203. A second source/drain terminal of NMOS FET 203 is connected to node 210. In accordance with at least one embodiment, node 210 can be used for power control of a wordline driver.

Positive supply voltage (e.g., Vdd) 206 is connected to a source terminal of PMOS FET 205 and to a positive supply terminal of power control memory cell 104. For example, the positive supply terminal of power control memory cell 104 may be connected to a positive supply terminal of inverter 201 and to a positive supply terminal of inverter 202. Negative supply voltage (e.g., Vss) 208 is connected to negative supply terminals of data memory cells 101, 102, and 103, and to a negative supply terminal of power supply memory cell 104. For example, the negative supply terminal of power control cell 104 may be connected to a negative supply terminal of inverter 201 and to a negative supply terminal of inverter 202.

In accordance with at least one embodiment, by selecting the row of memory cells 101, 102, and 103 and the power control memory cell 104 by asserting wordline 114, the state of power control memory cell 104 (i.e., the power control bit stored in power control memory cell 104) can be accessed via bitline 120 through NMOS FET 204, which is enabled by asserting wordline 114. When the power control bit stored in power control memory cell 104 is a logical zero, the corresponding low logic level is applied to the gate of PMOS FET 205, causing PMOS FET 205 to conduct and to apply positive supply voltage 206 to node 207 and the positive supply terminals of data memory cells 101, 102, and 103, thereby placing data memory cells 101, 102, and 103 into an active mode in which they are fully operational. When the power control bit stored in power control memory cell 104 is a logical one, the corresponding high logic level is applied to the gate of PMOS FET 205, causing PMOS FET 205 to stop conducting and to stop applying positive supply voltage 206 to node 207 and the positive supply terminals of data bit cells 101, 102, and 103, thereby placing data memory cells 101, 102, and 103 in an inactive mode, thereby saving power.

By virtue of inverters 201 and 202, a logical zero at node 209 is inverted to be a logical one at node 211, and a logical one at node 209 is inverted to be a logical zero at node 211. When wordline 114 is asserted, it applies a positive logic level to the gate of NMOS FET 203, causing NMOS FET 203 to conduct and to provide the logic level present at node 211 to node 210. Thus, node 210 is provided with an inverted logic level as compared with the logic level present at node 209 and, therefore, the state of power control memory cell 104. In accordance with at least one embodiment, the logic level present at node 210 is used, in conjunction with additional circuitry, for power control of a wordline driver associated with wordline 114. In accordance with at least one embodiment, the logic level present at node 211 is used, in conjunction with additional circuitry, for power control of a wordline driver associated with wordline 114. In accordance with at least one embodiment, the logic level present at node 209 is used, in conjunction with additional circuitry, for power control of a wordline driver associated with wordline 114. In accordance with at least one embodiment, the logic level at node 211 is used, instead of the logic level at node 209, to control PMOS FET 205 and to provide power control of data memory cells 101, 102, and 103. In accordance with at least one embodiment, an NMOS FET between negative supply terminals of data memory cells 101, 102, and 103 and negative supply voltage 208 is used instead of, or in conjunction with, PMOS FET 205 to act as a data cell power switch to control power for data cells 101, 102, and 103, wherein a gate of such NMOS FET would be connected to either node 209 or node 211.

Figure 3:
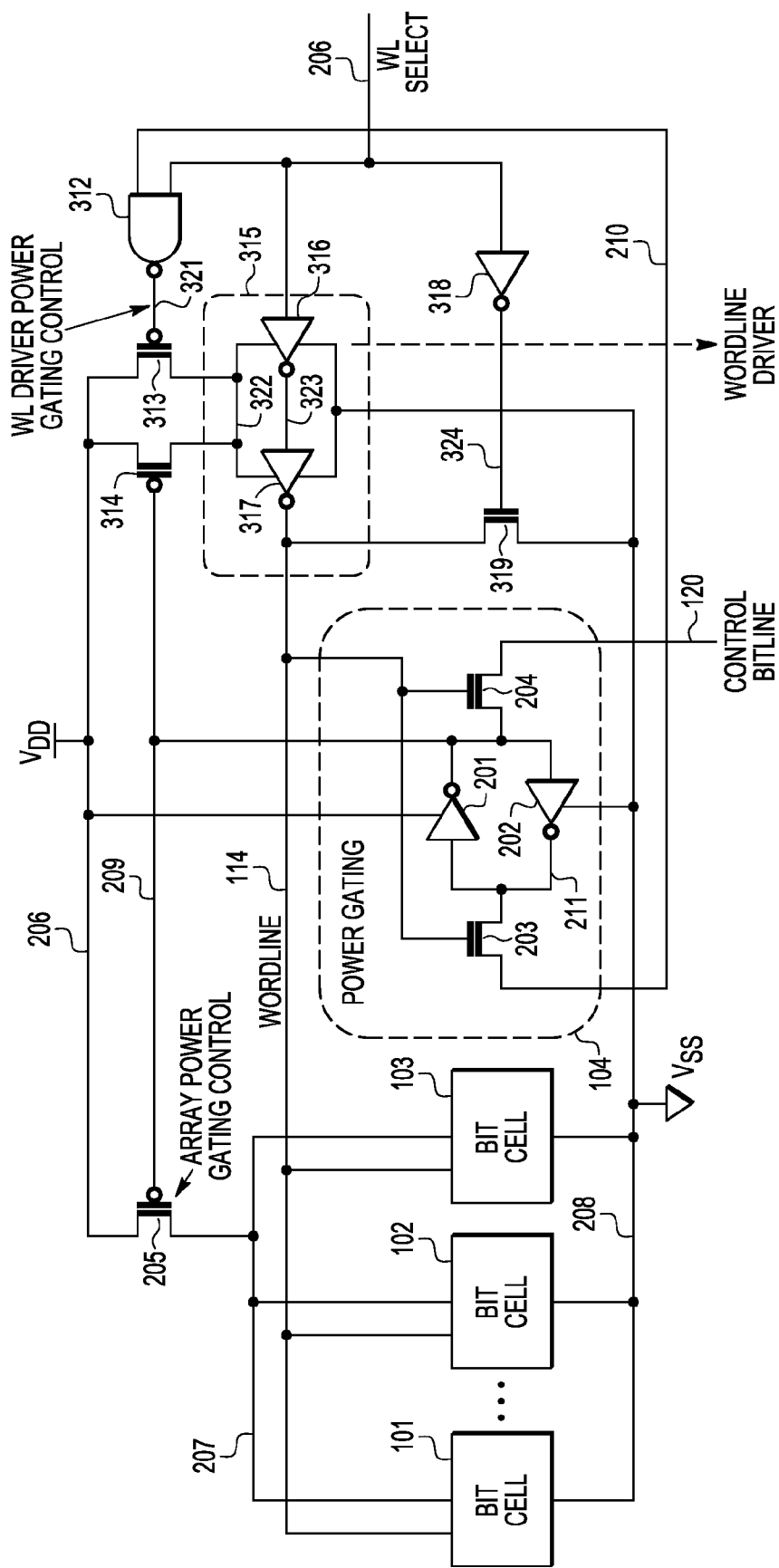
FIG. 3 is a schematic diagram of a row of memory cells with fine granularity power gating including wordline driver power gating in accordance with at least one embodiment.

FIG. 3 is a schematic diagram of a row of memory cells with fine granularity power gating including wordline driver power gating in accordance with an alternate embodiment. The row of memory cells comprises data memory cells 101, 102, and 103. Power control memory cell 104 is provided for the row of memory cells and controls power to the row of memory cells, allowing the row of memory cells to be enabled and disabled. Wordline 114 is connected to data memory cells 101, 102, and 103 and to power control memory cell 104. Bitline 120 is connected to power control memory cell 104.

Power control memory cell 104 comprises inverter 201, inverter 202, negative type (n type) channel (n channel) metal oxide semiconductor (MOS) field effect transistor 203, and NMOS FET 204. Bitline 120 is connected to a first source/drain terminal of NMOS FET 204. Wordline 114 is connected to a gate terminal of NMOS FET 204. A second source/drain terminal of NMOS FET 204 is connected to node 209, which is connected to an output of inverter 201, to an input of inverter 202, to a gate terminal of positive type (p type) channel (p channel) metal oxide semiconductor (MOS) field effect transistor (FET) 205, which functions as a data cell power switch, and to a gate terminal of PMOS FET 314, which, in conjunction with PMOS FET 313, functions as a wordline driver power switch. In accordance with at least one embodiment, node 209 serves as the output of power control memory cell 104, and the logic state of node 209 is the state of power control memory cell 104. A drain terminal of PMOS FET 205 is connected to node 207, which is connected to positive supply terminals of data memory cells 101, 102, and 103.

The output of inverter 202 is connected to node 211, which is connected to the input of inverter 201 and to a first source/drain terminal of NMOS FET 203. Wordline 114 is connected to a gate terminal of NMOS FET 203. A second source/drain terminal of NMOS FET 203 is connected to node 210, which is connected to an input of inverting logical AND (i.e., NAND) gate 312. In accordance with at least one embodiment, node 210 can be used for power control of a wordline driver.

Positive supply voltage 206 is connected to a source terminal of PMOS FET 205, to a positive supply terminal of power control memory cell 104, to a source terminal of PMOS FET 314, to a source terminal of PMOS FET 313, to a positive supply terminal of NAND gate 312, and to a positive supply terminal of inverter 318. For example, the positive supply terminal of power control memory cell 104 may be connected to a positive supply terminal of inverter 201 and to a positive supply terminal of inverter 202. Negative supply voltage 208 is connected to negative supply terminals of data memory cells 101, 102, and 103, to a negative supply terminal of power supply memory cell 104, to a negative supply terminal of wordline driver 315, to a negative supply terminal of NAND gate 312, and to a negative supply terminal of inverter 318. For example, the negative supply terminal of power control cell 104 may be connected to a negative supply terminal of inverter 201 and to a negative supply terminal of inverter 202. For example, the negative supply terminal of wordline driver 315 may be connected to a negative supply terminal of inverter 316 and to a negative supply terminal of inverter 317.

A wordline select line 320 is connected to a second input of NAND gate 312, to an input of wordline driver 315, and to an input of inverter 318. For example, the input of wordline driver 315 may be connected to an input of inverter 316.

An output of NAND gate 312 is connected to node 321, which is connected to a gate terminal of PMOS FET 313, which, in conjunction with PMOS FET 314, acts as a wordline driver power switch. A drain of PMOS FET 313 and a drain of PMOS FET 314 are connected to node 322, which is connected to a positive supply terminal of inverter 316 and to a positive supply terminal of inverter 317. An output of inverter 316 is connected to an input of inverter 317, thereby restoring the same logic level at wordline 114, which is connected to the output of inverter 317, as is present at wordline select line 320, provided wordline driver 315 is enabled.

An output of inverter 318 is connected to node 324, which is connected to a gate of NMOS FET 319. A source terminal of NMOS FET 319 is connected to negative supply voltage 208. A drain terminal of NMOS FET 319 is connected to wordline 114.

By selecting the row of memory cells 101, 102, and 103 and the power control memory cell 104 by asserting wordline 114, the state of power control memory cell 104 (i.e., the power control bit stored in power control memory cell 104) can be accessed via bitline 120 through NMOS FET 204, which is enabled by asserting wordline 114. When the power control bit stored in power control memory cell 104 is a logical zero, the corresponding low logic level is applied to the gate of PMOS FET 205, causing PMOS FET 205 to conduct and to apply positive supply voltage 206 to node 207 and the positive supply terminals of data memory cells 101, 102, and 103, thereby placing data memory cells 101, 102, and 103 into an active mode in which they are fully operational. When the power control bit store in power control memory cell 104 is a logical one, the corresponding high logic level is applied to the gate of PMOS FET 205, causing PMOS FET 205 to stop conducting and to stop applying positive supply voltage 206 to node 207 and the positive supply terminals of data bit cells 101, 102, and 103, thereby placing data memory cells 101, 102, and 103 in an inactive mode, thereby saving power.

By virtue of inverters 201 and 202, a logical zero at node 209 is inverted to be a logical one at node 211, and a logical one at node 209 is inverted to be a logical zero at node 211. When wordline 114 is asserted, it applies a positive logic level to the gate of NMOS FET 203, causing NMOS FET 203 to conduct and to provide the logic level present at node 211 to node 210. Thus, node 210 is provided with an inverted logic level as compared with the logic level present at node 209 and, therefore, the state of power control memory cell 104. The logic level present at node 210 is used, in conjunction with additional circuitry, for power control of a wordline driver associated with wordline 114. In accordance with at least one embodiment, the logic level present at node 211 is used, in conjunction with additional circuitry, for power control of a wordline driver associated with wordline 114. The logic level present at node 209 is used, in conjunction with additional circuitry, for power control of a wordline driver associated with wordline 114. The logic level at node 211 is used, instead of the logic level at node 209, to control PMOS FET 205 and to provide power control of data memory cells 101, 102, and 103. An NMOS FET between negative supply terminals of data memory cells 101, 102, and 103 and negative supply voltage 208 is used instead of, or in conjunction with, PMOS FET 205 to act as a data cell power switch to control power for data cells 101, 102, and 103, wherein a gate of such NMOS FET would be connected to either node 209 or node 211.

When wordline select line 320 is at a low logic level (e.g., logical zero), inverter 318 inverts such low logic level to a high logic level (e.g., logical one), which is applied to the gate of NMOS FET 319, causing NMOS FET 319 to conduct and pull wordline 114 to a low logic level. When wordline select line 320 is at a high logic level and node 209 at the output of power control memory cell 104 is at a low logic level, data memory cells 101, 102, and 103 are intended to be active, and the low logic level at node 209 is applied to the gate of PMOS FET 314, causing it to conduct and supply power to wordline driver 315, which passes the high logic level of wordline select line 320 to wordline 114, allowing wordline 114 to enable access to data memory cells 101, 102, and 103 and to power control memory cell 104. When wordline select line 320 is at a high logic level and node 209 at the output of power control memory cell 104 is at a low logic level, data memory cells 101, 102, and 103 are intended to be inactive (e.g., powered down), and the high logic level at node 209 is applied to the gate of PMOS FET 314, causing it to stop conducting and to stop supplying power to wordline driver 315.

However, wordline driver 315 can alternatively receive power through PMOS FET 313 instead of PMOS FET 314 if both inputs of NAND gate 312 are at a high logic level, thereby applying a low logic level to the gate terminal of PMOS FET 313, causing PMOS FET 313 to conduct and provide power to wordline driver 315. If wordline select line 320 is at a high logic level, PMOS FET 313 will be caused to conduct if node 210 is raised to a high logic level. However, since PMOS FET 314 will already be conducting when power control memory cell 104 is outputting a low logic level at node 209, conduction of PMOS FET 313 would be redundant when power control memory cell 104 is outputting a low logic level at node 209. When power control memory cell 104 is outputting a high logic level at node 209, node 211 will be at a low logic level. If the inputs of NAND gate 312 default to a high logic level state when they are not being actively driven high or low, or if a current path to a high logic level (e.g., a pullup resistor to positive supply voltage (Vdd) 206) is provided, node 210 will effectively be raised to a high logic level when NMOS FET 203 is not conducting, which will be the case when wordline 114 is at a low logic level, as it will be when pulled low by inverter 318 and NMOS FET 319 when wordline select line 320 is at a low logic level.

Therefore, while power control memory cell 104 is in a power saving mode and is outputting a high logic level at node 209 and wordline select line 320 transitions from a low logic level to a high logic level, the high logic level of the wordline select line 320 and the high logic level at the inverted control bitline node 210 will bring the output of NAND 312 at node 321 low, thereby causing PMOS FET 322 to conduct and to provide power to wordline driver 315, which will drive wordline 114 with the high logic level (i.e., logical one) of wordline select line 320, thereby allowing control bitline 120 and inverted control bitline 210 to access power control memory cell 104. If control bitline 120 writes a low logic level to the output of power control memory cell 104 at node 209, that low logical level will cause PMOS FET 314 to conduct, thereby maintaining continued power supply to wordline driver 315. However, if control bitline 120 does not write a low logic level to the output of power control memory cell 104 at node 209, the high logic level appearing at wordline 114 will cause NMOS FET 203 to conduct, pulling node 210 low to the low logic level present at node 211, which will cause the output of NAND gate 312 at node 321 to go high, very quickly turning off the power being supplied to wordline driver 315. Thus, NMOS FET 203, NAND gate 312, and PMOS FET 313 function to provide a way to reactivate a row of memory after that row has been inactive (e.g., a way to wake up that row of memory from a sleep mode). Using complementary control bitlines, such that node 210 is connected to an inverted control bitline, a high logic level is applied to control bitline 120 and a low logic level is applied to the inverted control bitline at node 210 to place the power control memory cell 104 into an inactive (e.g., power saving) mode when wordline 114 is activated, and a low logic level is applied to control bitline 120 and a high logic level is applied to the inverted control bitline at node 210 to place the power control memory cell 104 into an active mode when wordline 114 is activated. In such case, the application of a high logic level to the inverted control bitline connected to node 210, in combination with a high logic level on the wordline select line 320, drives the output of NAND gate 312 at node 321 low, turning on PMOS FET 313 and applying power to wordline driver 315, thereby allowing the data memory cells of the row to be restored to an active mode from an inactive mode (e.g., to wake up from a sleep mode).

Accordingly, wordline 114 follows the state of wordline select line 320 when power control memory cell 104 has a low logic level, but, when power control memory cell 104 has a high logic level, wordline 114 has a low logic level when wordline select line 320 has a low logic level but wordline 114 changes to a high logic level long enough to allow control bitline 120 to access the power control memory cell 104, with wordline 114 either remaining at a high logic level if control bitline 120 writes a low logic level to power control memory cell 104 or promptly returning to a low logic level if control bitline 120 does not write a low logic level to power control memory cell 104.

Figure 4:
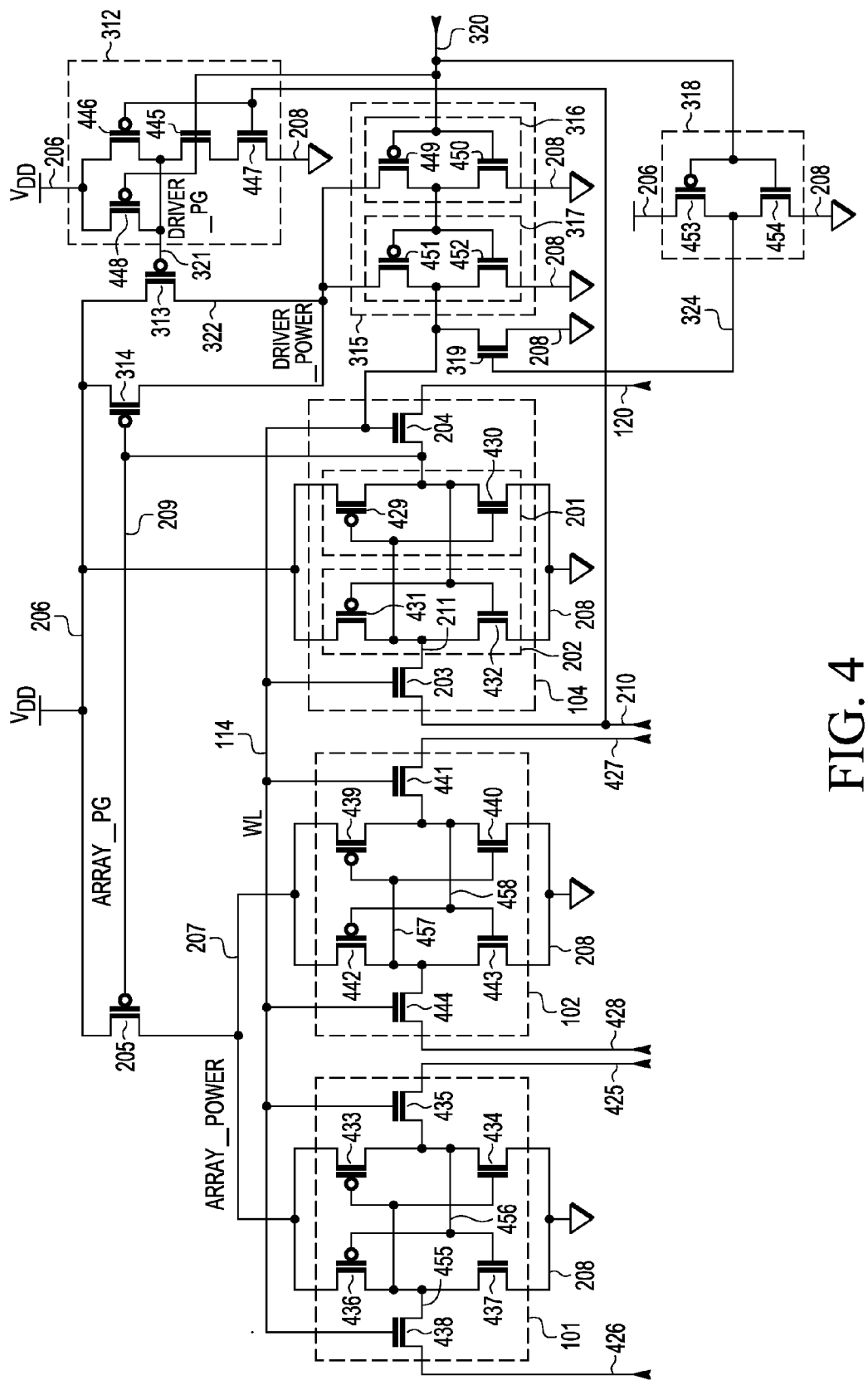
FIG. 4 is a more detailed schematic diagram of a row of memory cells with fine granularity power gating including wordline driver power gating in accordance with at least one embodiment.

FIG. 4 is a more detailed schematic diagram of a row of memory cells with fine granularity power gating including wordline driver power gating in accordance with at least one embodiment. The reference numerals of FIG. 4 which also appear in one or more of FIGS. 1, 2, and 3 represent the same elements illustrated in those drawings and described in the preceding text. Thus, FIG. 4 is a more specific embodiment of the embodiment illustrated in FIG. 3.

Data memory cell 101 comprises PMOS FET 433, NMOS FET 434, NMOS FET 435, PMOS FET 436, NMOS FET 437, and NMOS FET 438. PMOS FET 433 and NMOS FET 434 form an inverter having an input at node 455 and an output at node 456. PMOS FET 436 and NMOS FET 437 form an inverter having an input at node 456 and an output at node 455. Node 456 is selectively connected to bitline 425 through NMOS FET 435, which has its gate terminal connected to wordline 114. Node 455 is selectively connected to inverted bitline 426 through NMOS FET 438, which has its gate terminal connected to wordline 114.

Data memory cell 102 comprises PMOS FET 439, NMOS FET 440, NMOS FET 441, PMOS FET 442, NMOS FET 443, and NMOS FET 444. PMOS FET 439 and NMOS FET 440 form an inverter having an input at node 457 and an output at node 458. PMOS FET 442 and NMOS FET 443 form an inverter having an input at node 458 and an output at node 457. Node 458 is selectively connected to bitline 427 through NMOS FET 441, which has its gate terminal connected to wordline 114. Node 457 is selectively connected to inverted bitline 428 through NMOS FET 444, which has its gate terminal connected to wordline 114.

Inverter 201 comprises PMOS FET 429 and NMOS FET 430. Inverter 202 comprises PMOS FET 431 and NMOS FET 432. The input of inverter 201 is connected to the gate terminals of PMOS FET 429 and NMOS FET 430. The input of inverter 202 is connected to the gate terminals of PMOS FET 431 and NMOS FET 432. The source terminals of PMOS FET 429 and PMOS FET 431 are connected to positive supply voltage 206. The source terminals of NMOS FET 430 and NMOS FET 432 are connected to negative supply voltage 208. The output of inverter 201 is obtained from the junction of the drain terminals of PMOS FET 429 and NMOS FET 430. The output of inverter 202 is obtained from the junction of the drain terminals of PMOS FET 431 and NMOS FET 432.

Inverter 316 comprises PMOS FET 449 and NMOS FET 450. Inverter 317 comprises PMOS FET 451 and NMOS FET 452. The input of inverter 316 is connected to the gate terminals of PMOS FET 449 and NMOS FET 450. The input of inverter 317 is connected to the gate terminals of PMOS FET 451 and NMOS FET 452. The source terminals of PMOS FET 449 and PMOS FET 451 are connected to node 322. The source terminals of NMOS FET 450 and NMOS FET 452 are connected to negative supply voltage 208. The output of inverter 316 is obtained from the junction of the drain terminals of PMOS FET 449 and NMOS FET 450. The output of inverter 317 is obtained from the junction of the drain terminals of PMOS FET 451 and NMOS FET 452.

Inverter 318 comprises PMOS FET 453 and NMOS FET 454. The input of inverter 318 is connected to the gate terminals of PMOS FET 453 and NMOS FET 454. The source terminal of PMOS FET 453 is connected to positive supply voltage 206. The source terminal of NMOS FET 454 is connected to negative supply voltage 208. The output of inverter 318 is obtained from the junction of the drain terminals of PMOS FET 453 and NMOS FET 454.

Inverting logical AND gate (NAND gate) 312 comprises NMOS FET 445, PMOS FET 446, NMOS FET 447, and PMOS FET 448. Wordline select line 320 is connected to the gates of NMOS FET 445 and PMOS FET 448 as an input to NAND gate 312. Node 210 is connected to the gates of PMOS FET 446 and NMOS FET 447 as another input to NAND gate 312. A positive supply voltage 206 is connected to the source terminals of PMOS FETs 446 and 448. A negative supply voltage 208 is connected to the source terminal of NMOS FET 447. The output of NAND gate 312 is connected to drains of PMOS FETs 446 and 448 and to the drain of NMOS FET 445. The drain of NMOS FET 447 is connected to the source of NMOS FET 445.

Figure 5:
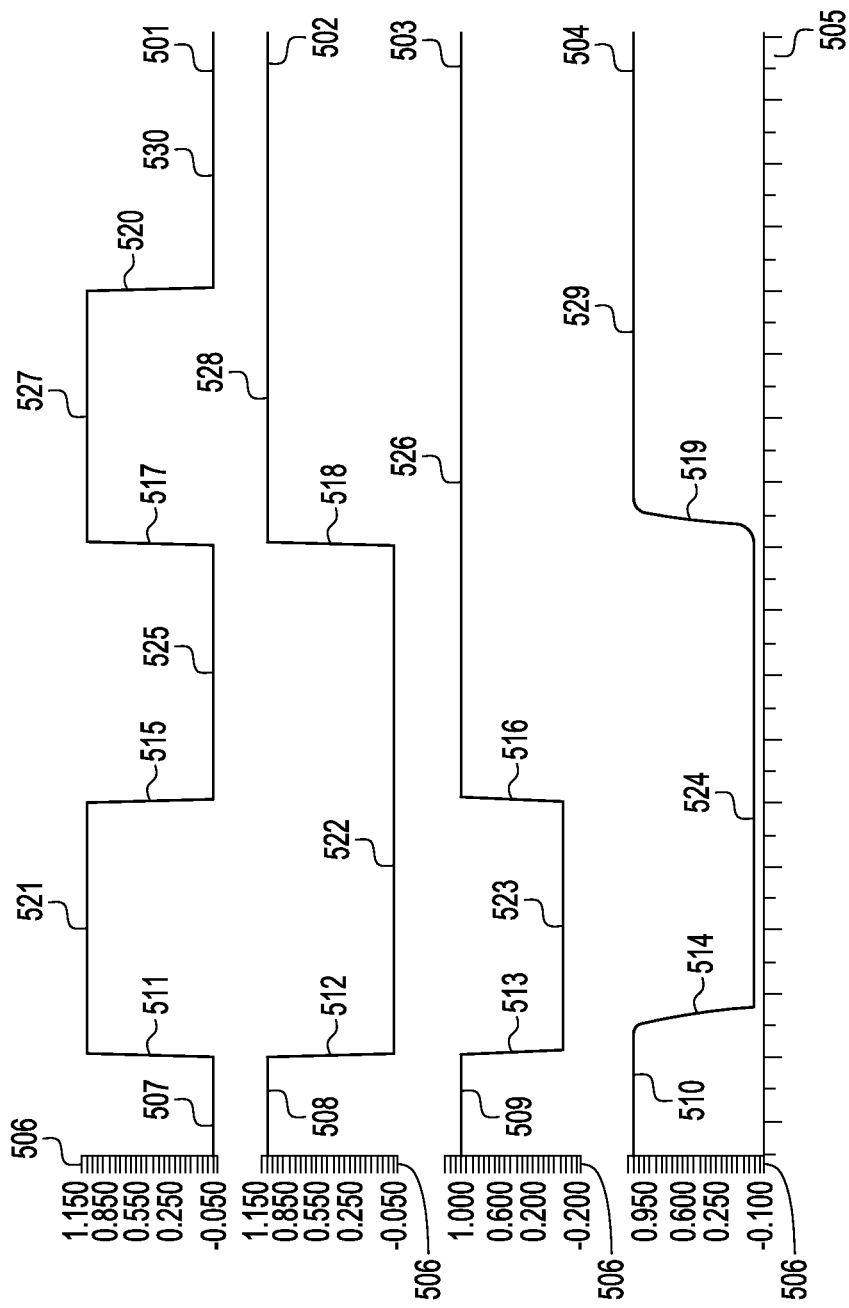
FIG. 5 is a timing diagram of a low power memory device with fine granularity power gating in accordance with at least one embodiment.

FIG. 5 is a timing diagram of a low power memory device with fine granularity power gating in accordance with at least one embodiment. The timing diagram illustrates a wordline select line signal of wordline select line 320 as waveform 501, a control bitline signal of control bitline 120 as waveform 502, a wordline driver power gating control signal of node 321 as waveform 503, and an array power gating control signal of node 207 as waveform 504. Waveforms 501, 502, 503, 504, and 505 are illustrated relative to x axis 505, which represents time, and y axes 506, which represents voltage, which individual voltage scales along y axis 506 for each of waveforms 501, 502, 503, and 504. Axis 506 is denominated in normalized units, which may be scaled by any desired factor to correspond to any desired voltage units.

Waveform 501 begins at a low logic level for duration 507. Waveform 502 begins at a high logic level for duration 508. Waveform 503 begins at a high logic level for duration 509. Waveform 504 begins at a high logic level 510. Waveform 501 makes a transition 511 to a high logic level, where it remains for duration 521. Approximately simultaneous with transition 511, waveform 502 makes a transition 512 to a low logic level, where it remains for duration 522. Approximately simultaneous with transitions 511 and 512, waveform 503 makes a transition 513 to a low logic level, where it remains for duration 523. Slightly after transitions 511, 512, and 513, waveform 505 makes a transition 514 to a low logic level, where it remains for duration 524. After duration 521, which is approximately as long as duration 523, waveform 501 makes a transition 515 to a low logic level, where it remains for duration 525. Approximately simultaneous with transition 515, waveform 503 makes a transition 516 to a high logic level, where it remains for duration 526.

After duration 525, waveform 501 makes a transition 517 to a high logic level, where it remains for duration 527. Approximately simultaneous with transition 517, waveform 502 makes a transition 518 to a high logic level, where it remains for duration 528. Slightly after transitions 517 and 518, waveform 504 makes a transition 519 to a high logic level, where it remains for duration 529. After duration 527, waveform 501 makes a transition 520 to a low logic level, where it remains for duration 530.

When wordline select line 320 is not asserted (e.g., is at a low logic level), as shown by waveform 501, the wordline driver power gating control signal remains in a power saving mode (e.g., at a high logic level), as shown by waveform 503. Even when wordline select line 320 is asserted (e.g., is at a high logic level), if the control bitline signal is in a power saving mode (e.g., is at a high logic level) (and the inverted bitline signal, if any, is also in a power saving mode (e.g., is at a low logic level)), as shown by waveform 502, the wordline driver power gating control signal remains in a power saving mode (e.g., at a high logic level), as shown by waveform 503. Thus, only when the wordline select line signal shown in waveform 501 is active (e.g., at a high logic level) and the control bitline signal shown in waveform 502 is in an operational mode (e.g., at a low logic level) does the wordline driver power gating control signal shown in waveform 503 enable power to the wordline driver. As can be seen from waveforms 504 and 502, the array power gating control signal of waveform 504 follows the control bitline signal of waveform 502, but with a slight delay.

In accordance with at least one embodiment, column level power control granularity is provided to control a low power state of a memory using a drowsy column control bit to control the low power state at an individual array column to protect the memory from weak bit failure. In accordance with at least one embodiment, a method of using a dedicated row of bit cells in a memory array, referred to as a drowsy column control row, is provided. Each bit of the drowsy column control row is used to control the low power state of a respective column of the array. A drowsy column control row control signal that is controlled from outside of the regular word line address space is used to access bit cells of the drowsy column control row. Each bit in the dedicated row acts as a control bit for controlling the drowsy/low power state of a respective column in the memory array. A mechanism is provided to designate the weak bit column and set the control bit corresponding to that particular column to disable the drowsy/low power state for that column.

Figure 6:
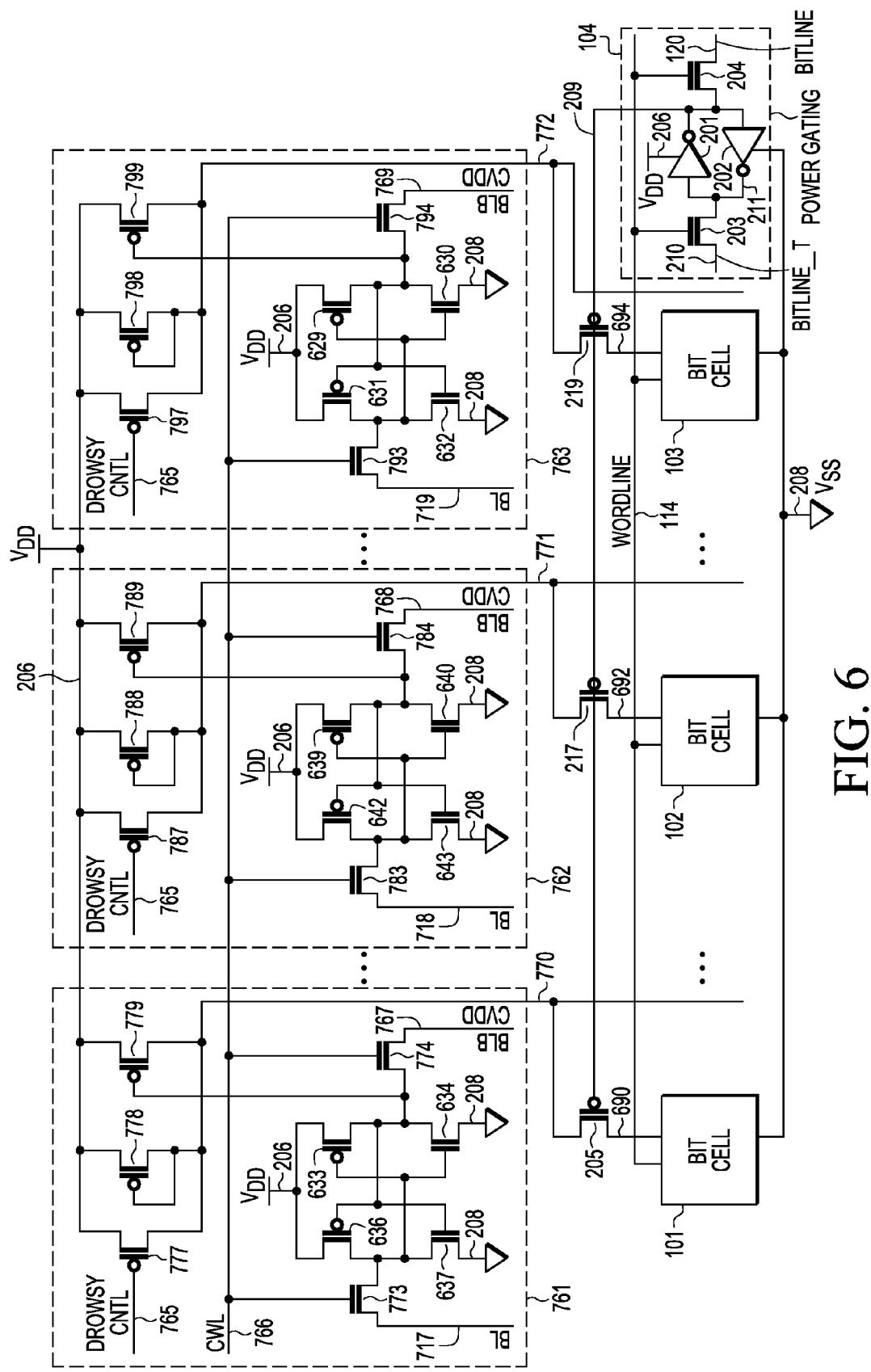
FIG. 6 is a schematic diagram of a row of memory cells with fine granularity power gating in accordance with at least one embodiment.

FIG. 6 is a schematic diagram of a row of memory cells with fine granularity power gating in accordance with at least one embodiment. The row of memory cells comprises data memory cells (e.g., bit cells) 101, 102, and 103. Power control memory cell 104 is provided for the row of memory cells and controls power to the row of memory cells, allowing the row of memory cells to be enabled and disabled as describe previously. A drowsy column control row includes column drowsy control bit cells 761, 762, and 763 that are connected to corresponding columns of the memory array to control, on a per column basis, power provided to the memory array, thus allowing memory cells of different columns within the row of memory cells to have their power states selectively controlled. As an example, column drowsy control bit cells 761, 762, and 763 may have their states cleared and set to maintain full power operation of and to select drowsy power application to memory cells of their respective columns. Wordline 114 is connected to data memory cells 101, 102, and 103 and to power control memory cell 104. Bitline 120 is connected to power control memory cell 104. Bitlines connected to data memory cells 101-103 are illustrated in greater detail herein.

In accordance with at least one embodiment, power control memory cell 104 comprises inverter 201, inverter 202, negative type (n type) channel (n channel) metal oxide semiconductor (MOS) field effect transistor (FET) (i.e., NMOS FET) 203, and NMOS FET 204. Bitline 120 is connected to a first source/drain terminal of NMOS FET 204. Wordline 114 is connected to a gate terminal of NMOS FET 204. A second source/drain terminal of NMOS FET 204 is connected to node 209, which is connected to an output of inverter 201, to an input of inverter 202, and to a gate terminal of each of positive type (p type) channel (p channel) metal oxide semiconductor (MOS) field effect transistors (FETs) (i.e., PMOS FETs) 205, 217, and 219, which function as a data cell power switches that provide power to bit cells 101, 102, and 103. In accordance with at least one embodiment, node 209 serves as the output of power control memory cell 104, and the logic state of node 209 is the state of power control memory cell 104. A drain terminal of PMOS FET 205 is connected to node 690, which is connected to bit cell 101. A drain terminal of PMOS FET 217 is connected to node 692, which is connected to bit cell 102. A drain terminal of PMOS FET 219 is connected to node 694, which is connected to bit cell 103.

The output of inverter 202 is connected to node 211, which is connected to the input of inverter 201 and to a first source/drain terminal of NMOS FET 203. Wordline 114 is connected to a gate terminal of NMOS FET 203. A second source/drain terminal of NMOS FET 203 is connected to node 210. In accordance with at least one embodiment, node 210 can be used for power control of a wordline driver.

Positive supply voltage (e.g., Vdd) 206 is connected to a source terminal of each of PMOS FETs 777, 778, 779, 787, 788, 789, 797, 798, and 799 and to a positive supply terminal of power control memory cell 104. For example, the positive supply terminal of power control memory cell 104 may be connected to a positive supply terminal of inverter 201 and to a positive supply terminal of inverter 202. Negative supply voltage (e.g., Vss) 208 is connected to negative supply terminals of data memory cells 101, 102, and 103, to a negative supply terminal of power supply memory cell 104, and to a source terminal of each of NMOS FETs 637, 634, 643, 640, 632, and 630. For example, the negative supply terminal of power control cell 104 may be connected to a negative supply terminal of inverter 201 and to a negative supply terminal of inverter 202.

In accordance with at least one embodiment, column drowsy control bit cell 761 comprises drowsy control PMOS FET 777, PMOS FET 778, column drowsy control bit cell output PMOS FET 779, column drowsy control bit cell PMOS FET 636, column control drowsy control bit cell PMOS FET 633, column drowsy control bit cell NMOS FET 637, column drowsy control bit cell NMOS FET 634, column drowsy control bit cell bitline NMOS FET 773, and column drowsy control bit cell complementary bitline NMOS FET 774. A column drowsy control bit cell word line (CWL) 766 is connected to a gate terminal of column drowsy control bit cell bitline NMOS FET 773 and to a gate terminal of column drowsy control bit cell bitline NMOS FET 774. A bitline 717 is connected to a first terminal, which may be a source terminal or a drain terminal, of column drowsy control bit cell bitline NMOS FET 773. A complementary bitline 767 is connected to a first terminal, which may be a source terminal or a drain terminal, of column drowsy control bit cell bitline NMOS FET 774. A second terminal, which may be a drain terminal or a source terminal, of column drowsy control bit cell bitline NMOS FET 773 is connected to a drain terminal of column drowsy control bit cell PMOS FET 636, to a gate terminal of column control drowsy control bit cell PMOS FET 633, to a drain terminal of column drowsy control bit cell NMOS FET 637, and to a gate terminal of column drowsy control bit cell NMOS FET 634. A second terminal, which may be a drain terminal or a source terminal, of column drowsy control bit cell bitline NMOS FET 774 is connected to a gate terminal of column drowsy control bit cell PMOS FET 636, to a drain terminal of column control drowsy control bit cell PMOS FET 633, to a gate terminal of column drowsy control bit cell NMOS FET 637, to a drain terminal of column drowsy control bit cell NMOS FET 634, and to a gate terminal of column drowsy control bit cell output PMOS FET 779. A positive supply voltage VDD 206 is connected to a source terminal of column drowsy control bit cell PMOS FET 636 and to a source terminal of column control drowsy control bit cell PMOS FET 633. A source terminal of column drowsy control bit cell NMOS FET 637 and a source terminal of column drowsy control bit cell NMOS FET 634 are connected to a negative supply voltage (e.g., ground) 208.

A drowsy control line 765 is connected to a gate terminal of drowsy control PMOS FET 777. A gate terminal of PMOS FET 778 is connected to a drain terminal of PMOS FET 778. A drain terminal of drowsy control PMOS FET 777, a drain terminal of PMOS FET 778, and a drain terminal of column drowsy control bit cell output PMOS FET 779 are connected to a column positive supply voltage CVDD 770, which is connected to a source terminal of PMOS FET 205.

In accordance with at least one embodiment, column drowsy control bit cell 762 comprises drowsy control PMOS FET 787, PMOS FET 788, column drowsy control bit cell output PMOS FET 789, column drowsy control bit cell PMOS FET 642, column control drowsy control bit cell PMOS FET 639, column drowsy control bit cell NMOS FET 643, column drowsy control bit cell NMOS FET 640, column drowsy control bit cell bitline NMOS FET 783, and column drowsy control bit cell complementary bitline NMOS FET 784. A column drowsy control bit cell word line (CWL) 766 is connected to a gate terminal of column drowsy control bit cell bitline NMOS FET 783 and to a gate terminal of column drowsy control bit cell bitline NMOS FET 784. A bitline 718 is connected to a first terminal, which may be a source terminal or a drain terminal, of column drowsy control bit cell bitline NMOS FET 783. A complementary bitline 768 is connected to a first terminal, which may be a source terminal or a drain terminal, of column drowsy control bit cell bitline NMOS FET 784. A second terminal, which may be a drain terminal or a source terminal, of column drowsy control bit cell bitline NMOS FET 783 is connected to a drain terminal of column drowsy control bit cell PMOS FET 642, to a gate terminal of column control drowsy control bit cell PMOS FET 639, to a drain terminal of column drowsy control bit cell NMOS FET 643, and to a gate terminal of column drowsy control bit cell NMOS FET 640. A second terminal, which may be a drain terminal or a source terminal, of column drowsy control bit cell bitline NMOS FET 784 is connected to a gate terminal of column drowsy control bit cell PMOS FET 642, to a drain terminal of column control drowsy control bit cell PMOS FET 639, to a gate terminal of column drowsy control bit cell NMOS FET 643, to a drain terminal of column drowsy control bit cell NMOS FET 640, and to a gate terminal of column drowsy control bit cell output PMOS FET 789. A positive supply voltage VDD 206 is connected to a source terminal of column drowsy control bit cell PMOS FET 642 and to a source terminal of column control drowsy control bit cell PMOS FET 639. A source terminal of column drowsy control bit cell NMOS FET 643 and a source terminal of column drowsy control bit cell NMOS FET 640 are connected to a negative supply voltage (e.g., ground) 208.

A drowsy control line 765 is connected to a gate terminal of drowsy control PMOS FET 787. A gate terminal of PMOS FET 788 is connected to a drain terminal of PMOS FET 788. A drain terminal of drowsy control PMOS FET 787, a drain terminal of PMOS FET 788, and a drain terminal of column drowsy control bit cell output PMOS FET 789 are connected to a column positive supply voltage CVDD 771, which is connected to a source terminal of PMOS FET 217.

In accordance with at least one embodiment, column drowsy control bit cell 763 comprises drowsy control PMOS FET 797, PMOS FET 798, column drowsy control bit cell output PMOS FET 799, column drowsy control bit cell PMOS FET 631, column control drowsy control bit cell PMOS FET 629, column drowsy control bit cell NMOS FET 632, column drowsy control bit cell NMOS FET 630, column drowsy control bit cell bitline NMOS FET 793, and column drowsy control bit cell complementary bitline NMOS FET 794. A column drowsy control bit cell word line (CWL) 766 is connected to a gate terminal of column drowsy control bit cell bitline NMOS FET 793 and to a gate terminal of column drowsy control bit cell bitline NMOS FET 794. A bitline 719 is connected to a first terminal, which may be a source terminal or a drain terminal, of column drowsy control bit cell bitline NMOS FET 793. A complementary bitline 769 is connected to a first terminal, which may be a source terminal or a drain terminal, of column drowsy control bit cell bitline NMOS FET 794. A second terminal, which may be a drain terminal or a source terminal, of column drowsy control bit cell bitline NMOS FET 793 is connected to a drain terminal of column drowsy control bit cell PMOS FET 631, to a gate terminal of column control drowsy control bit cell PMOS FET 629, to a drain terminal of column drowsy control bit cell NMOS FET 632, and to a gate terminal of column drowsy control bit cell NMOS FET 630. A second terminal, which may be a drain terminal or a source terminal, of column drowsy control bit cell bitline NMOS FET 794 is connected to a gate terminal of column drowsy control bit cell PMOS FET 631, to a drain terminal of column control drowsy control bit cell PMOS FET 629, to a gate terminal of column drowsy control bit cell NMOS FET 632, to a drain terminal of column drowsy control bit cell NMOS FET 630, and to a gate terminal of column drowsy control bit cell output PMOS FET 799. A positive supply voltage VDD 206 is connected to a source terminal of column drowsy control bit cell PMOS FET 631 and to a source terminal of column control drowsy control bit cell PMOS FET 629. A source terminal of column drowsy control bit cell NMOS FET 632 and a source terminal of column drowsy control bit cell NMOS FET 630 are connected to a negative supply voltage (e.g., ground) 208.

A drowsy control line 765 is connected to a gate terminal of drowsy control PMOS FET 797. A gate terminal of PMOS FET 798 is connected to a drain terminal of PMOS FET 798. A drain terminal of drowsy control PMOS FET 797, a drain terminal of PMOS FET 798, and a drain terminal of column drowsy control bit cell output PMOS FET 799 are connected to a column positive supply voltage CVDD 772, which is connected to a source terminal of PMOS FET 219.

In accordance with at least one embodiment, by selecting the row of memory cells 101, 102, and 103 and of the power control memory cell 104 by asserting wordline 114, the state of power control memory cell 104 (i.e., the power control bit stored in power control memory cell 104) can be accessed via bitline 120 through NMOS FET 204, which is enabled by asserting wordline 114. When the power control bit stored in power control memory cell 104 is a logical zero, the corresponding low logic level is applied to the gate of each of PMOS FETs 205, 217, and 219, causing PMOS FETs 205, 217, and 219 to conduct and to apply positive supply voltages 770, 771, and 772 to nodes 690, 692, and 694, respectively. When the power control bit stored in power control memory cell 104 is a logical one, the corresponding high logic level is applied to the gate of each of PMOS FETs 205, 217, and 219, causing PMOS FETs 205, 217, and 219 to stop conducting and to stop applying positive supply voltages 770, 771, and 772 to nodes 690, 692, and 694, respectively, thereby placing bit cells 101, 102, and 103 in an inactive mode and thereby saving power.

By virtue of inverters 201 and 202, a logical zero at node 209 is inverted to be a logical one at node 211, and a logical one at node 209 is inverted to be a logical zero at node 211. When wordline 114 is asserted, it applies a positive logic level to the gate of NMOS FET 203, causing NMOS FET 203 to conduct and to provide the logic level present at node 211 to node 210. Thus, node 210 is provided with an inverted logic level as compared with the logic level present at node 209 and, therefore, the state of power control memory cell 104. In accordance with at least one embodiment, when NMOS FET 203 is conductive, the logic level at node 211 is communicated to node 210, which, in conjunction with additional circuitry (examples of which may be seen in FIGS. 3 and 4), provides power control of a wordline driver (examples of which may be seen in FIGS. 3 and 4) associated with wordline 114. In accordance with at least one embodiment, when NMOS FET 204 is conductive, the logic level present at node 209 is communicated to node 120, which may be used to provide a bitline output. In accordance with at least one embodiment, when NMOS FET 204 is conductive, a logic level applied to a control bitline at node 120 (for example, as illustrated in FIGS. 3 and 4) is communicated to node 209, which allows control of the state of power control memory cell 104.

In accordance with at least one embodiment, the logic level present at node 209 is used, in conjunction with additional circuitry, for power control of a wordline driver associated with wordline 114. In accordance with at least one embodiment, the logic level at node 211 is used, instead of the logic level at node 209, to control PMOS FETs 205, 217, and 219 and to provide power control of data memory cells 101, 102, and 103. In accordance with at least one embodiment, an NMOS FET between negative supply terminals of data memory cells 101, 102, and 103 and negative supply voltage 208 is used instead of, or in conjunction with, PMOS FETs 205, 217, and 219 to act as a data cell power switch to control power for data cells 101, 102, and 103, wherein a gate of such NMOS FET would be connected to either node 209 or node 211.

Figure 7:
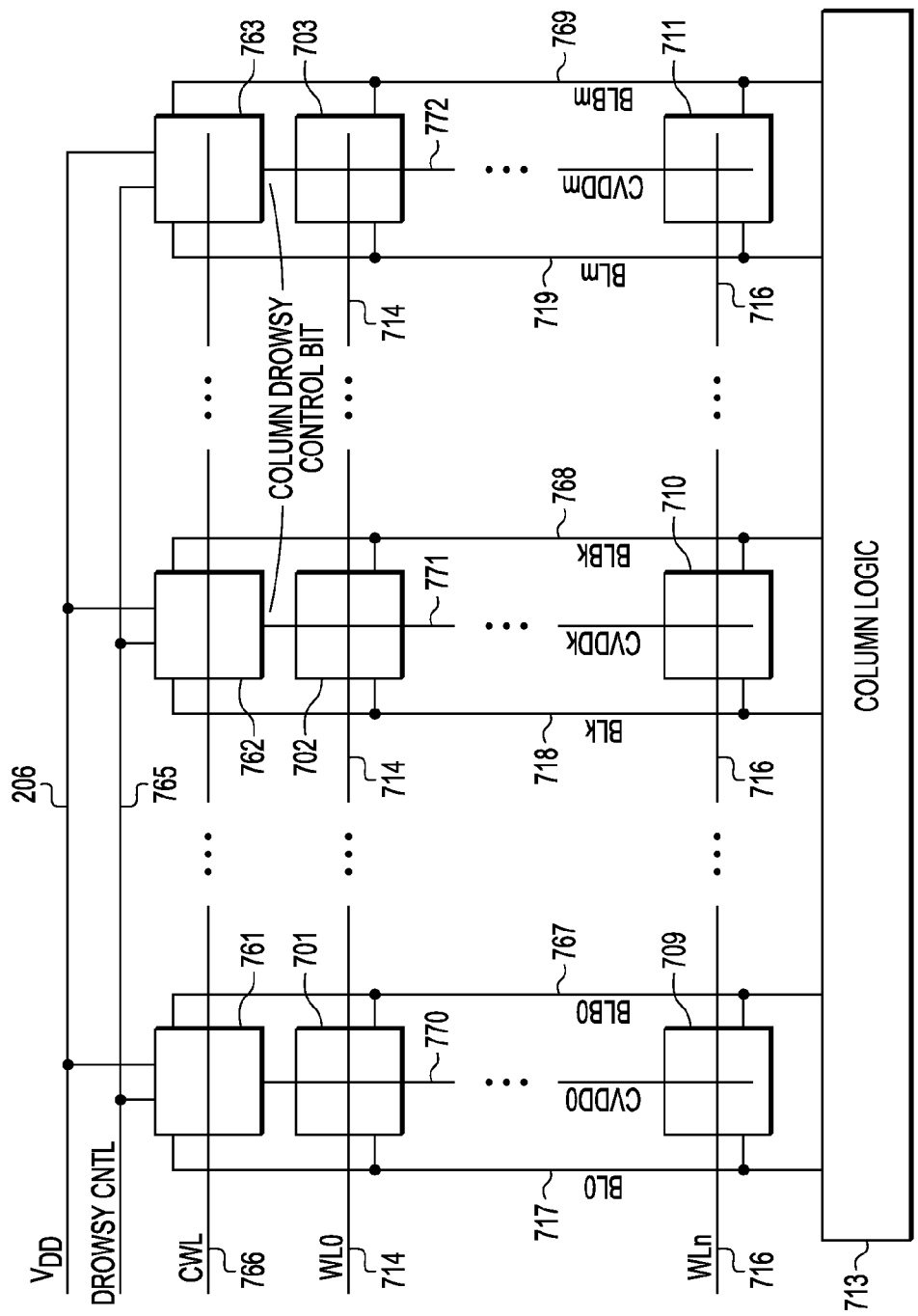
FIG. 7 is a block diagram of a memory architecture for implementing memory column drowsy control in accordance with at least one embodiment.

FIG. 7 is a block diagram of a memory architecture for implementing memory column drowsy control in accordance with at least one embodiment. The memory architecture comprises column logic 713, column drowsy control bit cells 761, 762, 763, and bit cells 701, 702, 703, 709, 710, and 711. A positive supply voltage (e.g., VDD) 206 is connected to column drowsy control bit cells 761, 762, and 763. Column drowsy control bit cell 761 is connected to and provides column positive supply voltage (e.g., CVDD0) 770 to bit cells 701 and 709 in a first column. Column drowsy control bit cell 762 is connected to and provides column positive supply voltage (e.g., CVDDk) 771 to bit cells 702 and 710 in a second column. Column drowsy control bit cell 763 is connected to and provides column positive supply voltage (e.g., CVDDm) to bit cells 703 and 711 in a third column. A drowsy control line 765 is connected to column drowsy control bit cells 761, 762, and 763. A column drowsy control bit cell word line (CWL) 766 is connected to column drowsy control bit cells 761, 762, and 763. A word line (e.g., WL0) 714 is connected to bit cells 701, 702, and 703 of a first row of bit cells. A word line (e.g., WLn) 716 is connected to bit cells 709, 710, and 711 of an nth row of bit cells.

Column logic 713 is connected to a bitline (e.g., BL0) 717 connected to column drowsy control bit cell 761, to bit cell 701, and to bit cell 709. Column logic 713 is connected to a complementary bitline (e.g., BLB0) 767 connected to column drowsy control bit cell 761, to bit cell 701, and to bit cell 709. Column logic 713 is connected to a bitline (e.g., BLk) 718 connected to column drowsy control bit cell 762, to bit cell 702, and to bit cell 710. Column logic 713 is connected to a complementary bitline (e.g., BLBk) 768 connected to column drowsy control bit cell 762, to bit cell 702, and to bit cell 710. Column logic 713 is connected to a bitline (e.g., BLm) 719 connected to column drowsy control bit cell 763, to bit cell 703, and to bit cell 711. Column logic 713 is connected to a complementary bitline (e.g., BLBm) 769 connected to column drowsy control bit cell 763, to bit cell 703, and to bit cell 711.

Figure 8:
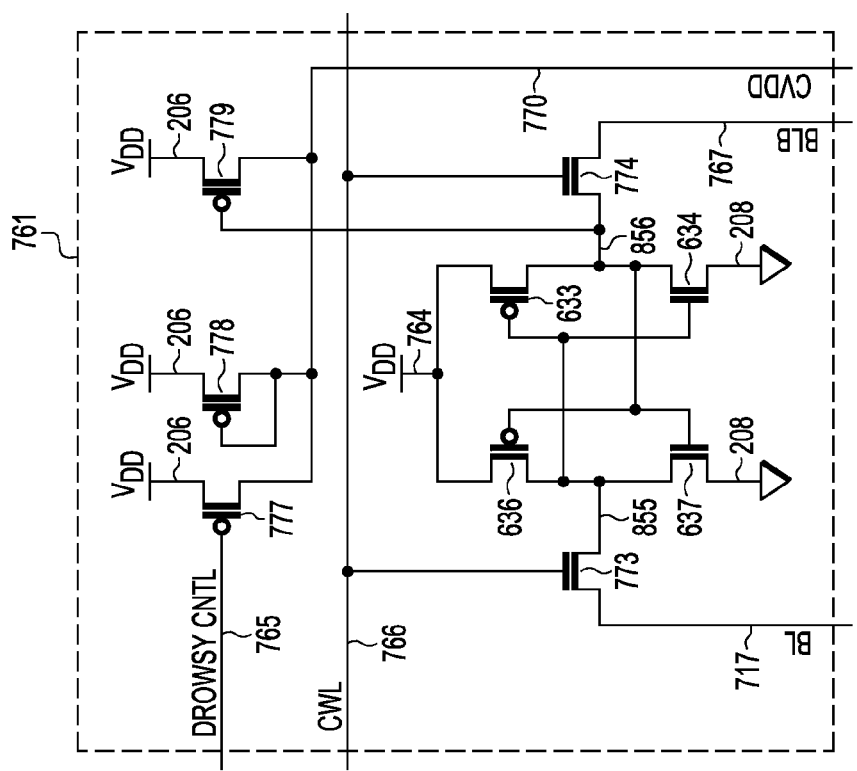
FIG. 8 is a schematic diagram of a column drowsy control bit cell for implementing memory column drowsy control in accordance with at least one embodiment.

FIG. 8 is a schematic diagram of a column drowsy control bit cell for implementing memory column drowsy control in accordance with at least one embodiment. In accordance with at least one embodiment, column drowsy control bit cell 761 comprises drowsy control PMOS FET 777, PMOS FET 778, column drowsy control bit cell output PMOS FET 779, column drowsy control bit cell PMOS FET 636, column control drowsy control bit cell PMOS FET 633, column drowsy control bit cell NMOS FET 637, column drowsy control bit cell NMOS FET 634, column drowsy control bit cell bitline NMOS FET 773, and column drowsy control bit cell complementary bitline NMOS FET 774. A column drowsy control bit cell word line (CWL) 766 is connected to a gate terminal of column drowsy control bit cell bitline NMOS FET 773 and to a gate terminal of column drowsy control bit cell bitline NMOS FET 774. A bitline 717 is connected to a first terminal, which may be a source terminal or a drain terminal, of column drowsy control bit cell bitline NMOS FET 773. A complementary bitline 767 is connected to a first terminal, which may be a source terminal or a drain terminal, of column drowsy control bit cell bitline NMOS FET 774. A second terminal, which may be a drain terminal or a source terminal, of column drowsy control bit cell bitline NMOS FET 773 is connected via node 855 to a drain terminal of column drowsy control bit cell PMOS FET 636, to a gate terminal of column control drowsy control bit cell PMOS FET 633, to a drain terminal of column drowsy control bit cell NMOS FET 637, and to a gate terminal of column drowsy control bit cell NMOS FET 634. A second terminal, which may be a drain terminal or a source terminal, of column drowsy control bit cell bitline NMOS FET 774 is connected via node 856 to a gate terminal of column drowsy control bit cell PMOS FET 636, to a drain terminal of column control drowsy control bit cell PMOS FET 633, to a gate terminal of column drowsy control bit cell NMOS FET 637, to a drain terminal of column drowsy control bit cell NMOS FET 634, and to a gate terminal of column drowsy control bit cell output PMOS FET 779. A positive supply voltage (e.g., VDD) 206 is connected to a source terminal of column drowsy control bit cell PMOS FET 636 and to a source terminal of column control drowsy control bit cell PMOS FET 633. A source terminal of column drowsy control bit cell NMOS FET 637 and a source terminal of column drowsy control bit cell NMOS FET 634 are connected to a negative supply voltage (e.g., ground) 208.

A drowsy control line 765 is connected to a gate terminal of drowsy control PMOS FET 777. A gate terminal of PMOS FET 778 is connected to a drain terminal of PMOS FET 778. A drain terminal of drowsy control PMOS FET 777, a drain terminal of PMOS FET 778, and a drain terminal of column drowsy control bit cell output PMOS FET 779 are connected to a column positive supply voltage CVDD 770, which is connected to bit cell 701 as its positive supply voltage.

Figure 9:
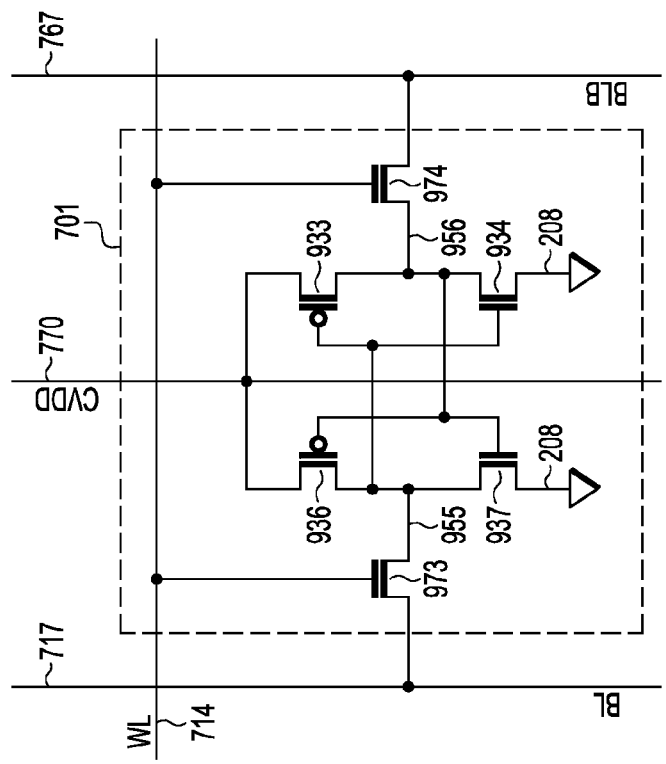
FIG. 9 is a schematic diagram of a bit cell for implementing memory column drowsy control in accordance with at least one embodiment.

FIG. 9 is a schematic diagram of a bit cell for implementing memory column drowsy control in accordance with at least one embodiment. In accordance with at least one embodiment, bit cell 701 comprises bit cell PMOS FET 936, bit cell PMOS FET 933, bit cell NMOS FET 937, bit cell NMOS FET 934, bit cell bitline NMOS FET 973, and bit cell complementary bitline NMOS FET 974. A word line (WL) 714 is connected to a gate terminal of bit cell bitline NMOS FET 973 and to a gate terminal of bit cell bitline NMOS FET 974. A bitline 717 is connected to a first terminal, which may be a source terminal or a drain terminal, of bit cell bitline NMOS FET 973. A complementary bitline 767 is connected to a first terminal, which may be a source terminal or a drain terminal, of bit cell bitline NMOS FET 974. A second terminal, which may be a drain terminal or a source terminal, of bit cell bitline NMOS FET 973 is connected to a drain terminal of bit cell PMOS FET 936, to a gate terminal of bit cell PMOS FET 933, to a drain terminal of bit cell NMOS FET 937, and to a gate terminal of bit cell NMOS FET 934. A second terminal, which may be a drain terminal or a source terminal, of bit cell bitline NMOS FET 974 is connected to a gate terminal of bit cell PMOS FET 936, to a drain terminal of bit cell PMOS FET 933, to a gate terminal of bit cell NMOS FET 937, and to a drain terminal of bit cell NMOS FET 934. A column positive supply voltage (e.g., CVDD) 770 is connected to a source terminal of bit cell PMOS FET 936 and to a source terminal of bit cell PMOS FET 933. A source terminal of bit cell NMOS FET 937 and a source terminal of bit cell NMOS FET 934 are connected to a negative supply voltage (e.g., ground) 208.

The ability to control power of a memory device on a per column basis may be used to provide power savings even in the presence of weak bits or under the risk of occurrence of weak bits. If, for example, weak bits are present in one column or a relatively few columns of a memory, memory column drowsy control may be used to reduce the voltage of other columns without weak bits to a reduced (e.g., drowsy) voltage level while maintaining the voltage of the column or columns comprising a weak bit or weak bits at a sufficient voltage level (e.g., at or near an operational voltage level) to prevent memory failure (e.g., data loss among the weak bit or weak bits). The significant power savings resulting from the reduction of voltage for the columns not containing weak bits based on the exponential relationship of leakage current to voltage, coupled with lack of impairment of using such a power saving technique by being able to selectively maintain a column or columns comprising a weak bit or weak bits at a sufficient voltage or voltages to avoid memory failure, allows power saving to be realized even in memory with one or more weak bits. Thus, selective fine grain control of drowsy/power gating of a memory array at an individual column level can provide improved memory power management.

In accordance with at least one embodiment, a drowsy column control bit overrides the drowsy (e.g., low power) state of a column within the bit array of the memory on a per column basis. By controlling the drowsy state at a per column level, fine grain control of power gating is provided. For example, if existing bit cells have a split power supply shared between adjacent rows, with pull down NMOS latches in the bit cells not connected together and with the bit cells of the adjacent rows sharing a common ground, disabling a drowsy (e.g., low power) state in a row centric approach is not feasible due to the split shared power supply, yet controlling the drowsy state on a per column basis is feasible and can provide significant power savings. An insidious aspect of having one row of such a configuration disabled using a drowsy state is that a weak bit cell in that one row can affect a portion of the bit cells in the two adjacent rows sharing a common power supply, possibly leading to corrupt data in both of the two adjacent rows, a problem that can be avoided by controlling the drowsy state on a per column basis rather than a per row basis. In accordance with at least one embodiment, all bit cells in a column share a common power supply which is separated from each adjacent column, thereby allowing fine grain drowsy control among all columns.

In accordance with at least one embodiment a drowsy control (e.g., power gating) technique for a memory array is provided. Such a technique may be used, for example, to implement power savings, for example in low power designs and methodologies. A drowsy column control bit may be used to control the low power state of a memory array at an individual column level. Column level granularity may be used to control the low power state to protect from weak bit memory failure. A low power state memory with selective column level control may be provided. As an example, such a memory may be used in a level 2/level 3 (L2/L3) cache. As an example, such a memory may be used in one or more memories in a system-on-a-chip (SOC).

In accordance with at least one embodiment, apparatus comprises a memory array comprising a plurality of columns of memory cells and a plurality of power control memory cells. Each of said plurality of power control memory cells is coupled to and controls power to a respective one of the plurality of columns of the memory cells. In accordance with at least one embodiment, the plurality of power control memory cells are organized in a control row. The control row is orthogonal to the plurality of columns. In accordance with at least one embodiment, the apparatus further comprises a plurality of power control circuits coupling the plurality of power control memory cells to the plurality of columns of the memory cells. The plurality of power control circuits are for selectively applying a drowsy level to at least one power supply node coupled to at least one column of the of the plurality of columns of the memory cells, causing the at least one column of the plurality of columns of the memory cells to provide memory retention at reduced power consumption. In accordance with at least one embodiment, the plurality of power control memory cells store power control data to control the plurality of power control circuits. In accordance with at least one embodiment, the plurality of power control circuits receive at least one drowsy control signal from at least one drowsy control line to override at least a portion of the power control data. In accordance with at least one embodiment, the plurality of power control memory cells are not placed in a drowsy mode but are maintained in an operational mode by maintaining a full voltage level, rather than a reduced voltage level (i.e., drowsy voltage level), at a power control memory cell power supply node coupled to the power control memory cells.

In accordance with at least one embodiment, apparatus comprises a memory array comprising a plurality of memory cells organized according to a plurality of rows and a plurality of columns and a control row comprising a plurality of power control memory cells for controlling power provided to the memory array, the plurality of power control memory cells organized according to the plurality of columns. In accordance with at least one embodiment, the control row is distinct from the plurality of rows. In accordance with at least one embodiment, the apparatus further comprises a plurality of power control circuits coupled to the power control memory cells and to the memory array, the plurality of power control circuits for gating power to the memory array. In accordance with at least one embodiment, the plurality of power control circuits provide a level selected from among a full voltage level and a reduced voltage level (i.e., drowsy voltage level), wherein the plurality of power control memory cells store power control data to select among the full level and the drowsy level. In accordance with at least one embodiment, the plurality of power control memory cells store power control data to select among the full level and the drowsy level on a per column basis. In accordance with at least one embodiment, the plurality of power control memory cells store power control data to select the full level for weak columns of the plurality of memory cells, wherein the weak columns include at least one weak memory cell incapable of memory retention at the drowsy level and to select the drowsy level for normal columns of the plurality of memory cells, wherein the normal columns consist of normal memory cells capable of memory retention at the drowsy level.

In accordance with at least one embodiment, apparatus comprises a memory cell for storing a stored datum comprising a power supply node for receiving power to operate the memory cell and a power control circuit coupled to the memory cell, wherein the power control circuit provides power to the power supply node at a full level to cause the memory cell to be capable of read and write operations and at a drowsy level to cause the memory cell to enter a stored datum retention mode wherein the memory cell retains the stored datum while consuming reduced power. In accordance with at least one embodiment, the drowsy level is a reduced voltage level at the power supply node. In accordance with at least one embodiment, the power control circuit comprises a regulated current source to provide power to the power supply node at the drowsy level. In accordance with at least one embodiment, the regulated current source comprises a transistor having a first terminal, a second terminal, and a control terminal, wherein the control terminal controls a current flow between the first terminal and the second terminal, wherein the control terminal is connected to the second terminal. In accordance with at least one embodiment, the transistor is a field-effect transistor, wherein the first terminal is a drain terminal, wherein the second terminal is a source terminal, and wherein the control terminal is a gate terminal. In accordance with at least one embodiment, the apparatus further comprises a first plurality of memory cells in a same memory column of a memory array as the memory cell and a second plurality of memory cells in at least one other memory column of the memory array, wherein the at least one other memory column is distinct from the same memory column, the power control circuit providing power to the memory cell and the first plurality of memory cells but not to the second plurality of memory cells. In accordance with at least one embodiment, the apparatus further comprises a first plurality of memory cells in a same memory row of a memory array as the memory cell and a second plurality of memory cells in at least one other memory row of the memory array, wherein the at least one other memory row is distinct from the same memory row, the power control circuit providing power to the memory cell and the first plurality of memory cells but not to the second plurality of memory cells. In accordance with at least one embodiment, the apparatus further comprises a drowsy control bit cell coupled to the power control circuit, wherein the drowsy control bit cell stores a value, wherein the value selects between the full level and the drowsy level.

What is claimed is:

1. Apparatus comprising:
a memory array comprising a plurality of memory cells organized according to a plurality of rows and a plurality of columns; and
a control row comprising a plurality of power control memory cells for controlling power provided to the memory array, the plurality of power control memory cells organized according to the plurality of columns, wherein the plurality of power control memory cells store power control data to select a full voltage level for a weak column of the plurality of memory cells, wherein the weak column includes at least one weak memory cell incapable of memory retention at a reduced voltage level, and the power control memory cells store power control data to select the reduced voltage level for a normal column of the plurality of memory cells, wherein the normal column consists of normal memory cells capable of memory retention at the reduced voltage level.

2. The apparatus of claim 1 wherein a power control memory cell of the control row controls a power state of a column of the plurality of columns.

3. The apparatus of claim 1 further comprising:
a plurality of power control circuits coupled to the power control memory cells and to the memory array, the plurality of power control circuits for gating power to the memory array.

4. The apparatus of claim 1 wherein a power control memory cell of the plurality of power control memory cells stores a value that indicates a voltage provided to the memory cells corresponding to the power control memory cell.

5. The apparatus of claim 4 wherein the plurality of power control memory cells store power control data to select among the full voltage level and the reduced voltage level on a per column basis.

6. Apparatus comprising:
a memory cell for storing a stored datum, said memory cell comprising a power supply node for receiving power to operate the memory cell;
a power switch coupled to the memory cell, wherein the power switch selectively provides power to the power supply node at a first voltage level to cause the memory cell to be capable of read and write operations and at a second voltage level to cause the memory cell to enter a stored datum retention mode wherein the memory cell retains the stored datum while consuming reduced power; and
a power control circuit coupled to the memory cell, wherein the power control circuit selectively provides the power to the power supply node at the first voltage level regardless of a power control state of the power switch, wherein the power control memory cell selects a full voltage level for a weak column of a plurality of memory cells comprising the memory cell, wherein the weak column includes at least one weak memory cell incapable of memory retention at a reduced voltage level, wherein a second power control memory cell selects a reduced voltage level for a normal column of the t of memo cells, wherein the normal column consists of normal memory cells capable of memory retention at the reduced voltage level.

7. The apparatus of claim 6 wherein the second voltage level is a reduced voltage level at the power supply node.

8. The apparatus of claim 6 wherein the power control circuit comprises a regulated current source to provide the power to the power supply node at the second voltage level.

9. The apparatus of claim 8 wherein the regulated current source comprises a transistor having a first terminal, a second terminal, and a control terminal, wherein the control terminal controls a current flow between the first terminal and the second terminal, wherein the control terminal is connected to the second terminal.

10. The apparatus of claim 9 wherein the transistor is a field-effect transistor, wherein the first terminal is a drain terminal, wherein the second terminal is a source terminal, and wherein the control terminal is a gate terminal.

11. The apparatus of claim 6 further comprising:
a first plurality of memory cells in a same memory column of a memory array as the memory cell; and
a second plurality of memory cells in at least one other memory column of the memory array, the power control circuit providing the power to the memory cell and to the first plurality of memory cells but not to the second plurality of memory cells.

12. The apparatus of claim 6 further comprising:
a first plurality of memory cells in a same memory row of a memory array as the memory cell; and
a second plurality of memory cells in at least one other memory row of the memory array, the power control circuit providing the power to the memory cell and to the first plurality of memory cells but not to the second plurality of memory cells.

13. A method comprising:
storing a stored datum in a memory cell comprising a power supply node for receiving power to operate the memory cell; and
providing power to the power supply node at a first voltage level to cause the memory cell to be capable of read and write operations in response to either a power saving control signal being inactive or a power control memory cell being in a first state when the power saving control signal is active and at a second voltage level to cause the memory cell to enter a stored datum retention mode wherein the memory cell retains the stored datum while consuming reduced power in response to the power saving control signal being active and the power control memory cell being in a second state when the power saving control signal is active, wherein the power control memory cell stores a power control datum to select a reduced voltage level for a normal column of a plurality of memory cells comprising the memory cell, wherein the normal column consists of normal memory cells capable of memory retention at the reduced voltage level, wherein a second power control memory cell stores a second power control datum to select a full voltage level for a weak column of the plurality of memory cells, wherein the weak column includes at least one weak memory cell incapable of memory retention at the reduced voltage level.

14. The method of claim 13 wherein the providing the power to the power supply node comprises:

providing the power from a regulated current source to the power supply node at the second voltage level in response to the power saving control signal being active and the power control memory cell being in the second state.

15. The method of claim 14 wherein the providing the power from the regulated current source to the power supply node at the second voltage level comprises:
controlling a current flow between a first terminal of a transistor and a second terminal of the transistor using a control terminal of the transistor, wherein the control terminal is connected to the second terminal.

16. The method of claim 15 wherein the transistor is a field-effect transistor, wherein the first terminal is a drain terminal, wherein the second terminal is a source terminal, and wherein the control terminal is a gate terminal.

17. The method of claim 13 wherein the providing the power to the power supply node comprises:
providing the power at the first voltage level to the memory cell and to a first plurality of memory cells but not to a second plurality of memory cells in response to either the power saving control signal being inactive or a power control memory cell being in a first state when the power saving control signal is active, wherein the first plurality of memory cells is in a same memory column of a memory array as the memory cell and wherein the second plurality of memory cells is in at least one other memory column of the memory array.

18. The method of claim 13 wherein the providing the power to the power supply node comprises:
providing the power at the first voltage level to the memory cell and a first plurality of memory cells but not to a second plurality of memory cells in response to either the power saving control signal being inactive or a power control memory cell being in a first state when the power saving control signal is active, wherein the first plurality of memory cells in a same memory row of a memory array as the memory cell and wherein the second plurality of memory cells is in at least one other memory row of the memory array.

19. The method of claim 13 further comprising:
selecting between the first voltage level and the second voltage level according to a value, wherein the value is stored in a power control bit cell coupled to the power control circuit.

* * * * *